(12) United States Patent
Jiang et al.

(10) Patent No.: US 8,051,730 B2
(45) Date of Patent: Nov. 8, 2011

(54) BALL SCREW UNIT WITH LUBRICATION APPARATUS

(75) Inventors: Zong-Sian Jiang, Taichung (TW); Edward Hsu, Taichung (TW)

(73) Assignee: HIWIN Technologies Corp., Taichung (TW)

( * ) Notice: Subject to any disclaimer, the term of this patent is extended or adjusted under 35 U.S.C. 154(b) by 478 days.

(21) Appl. No.: 12/335,531

(22) Filed: Dec. 15, 2008

(65) Prior Publication Data

US 2010/0147092 A1    Jun. 17, 2010

(51) Int. Cl.
*F16H 25/22* (2006.01)
*F16H 25/24* (2006.01)

(52) U.S. Cl. ............................. 74/89.44; 74/89.33

(58) Field of Classification Search ............... 74/89.25, 74/89.26, 89.4, 89.41, 89.43, 89.44

See application file for complete search history.

(56) References Cited

U.S. PATENT DOCUMENTS

| 260,366 | A | * | 7/1882 | Burr | 74/89.39 |
| 4,346,728 | A | * | 8/1982 | Sulzer | 137/243.6 |
| 5,782,135 | A | * | 7/1998 | Kondo et al. | 74/89.44 |
| 5,809,838 | A | * | 9/1998 | Miyaguchi et al. | 74/89.44 |
| 7,634,952 | B2 | * | 12/2009 | Chen et al. | 74/89.44 |
| 2001/0046335 | A1 | * | 11/2001 | Keller | 384/13 |
| 2008/0019621 | A1 | * | 1/2008 | Vierheilig et al. | 384/13 |

* cited by examiner

*Primary Examiner* — Richard W Ridley
*Assistant Examiner* — Terence Boes
(74) *Attorney, Agent, or Firm* — Chun-Ming Shih (57) ABSTRACT

A lubrication apparatus is for a ball screw unit in which the grease state lubricant is used. There is formed a helical guide track in the lubrication apparatus. When the ball screw unit operates, a guide member rotates with the bolt, the grease stored in the guide track will flow ahead to the front terminal of the guide track and ooze out of the grease outlet to lubricate the bolt with the aid of a pressure produced due to the inertia of the flowing fluid, and the quantity of the oozed grease is determined by the size of the grease outlet. The lubrication of the ball screw unit can be performed automatically without relying on the external force.

14 Claims, 8 Drawing Sheets

BALL SCREW UNIT WITH LUBRICATION APPARATUS

BACKGROUND OF THE INVENTION

1. Field of the Invention

The present invention relates to a ball screw unit with lubrication apparatus, in which the lubricating grease is used for lubrication.

2. Description of the Prior Art

The ball screw unit is essentially composed of a screw nut with coupled bolt and a plurality of rolling balls, wherein the nut and bolt move relatively by rolling the balls therebetween. As the ball screw unit performs the work extremely smooth with high precision, it is widely used by various moving sophisticated machinery requiring precise finishing work or fabrication of semiconductors. In order to operate the ball screw unit efficiently and smoothly, the lubrication of its helical track is very important, and neglecting lubrication of the ball screw unit for a long time will result in aggravating the abrasion of the unit by increased friction between the ball and nut.

To effectively reduce the abrasion of the ball screw unit, the installation of a lubrication system is necessary. There are two typical lubrication systems, the first one is affixing it to the two ends of the nut and applying the lubricant to the bolt surface with an applicator so as to lubricate the helical track; the second one is using the scrapers made of an oil contained material to install it at the two sides of the nut so as to contact directly with the bolt thereby lubricating the helical track.

A self lubricating bolt presently in use has an externally attached accessory on the nut, and the interior of the accessory is filled with a duly oil contained felt so as to apply the oil to the helical track when the bolt rotates with respect to the nut. In many electronic and semiconductor industries which require using dust free chambers, the liquid lubricant is a preferable choice for lubrication. However, liquid state lubricant is apt to be granulated so that it is inapplicable to the electronic and semiconductor industries where the absolutely dust free environment is a must.

Figure 1:
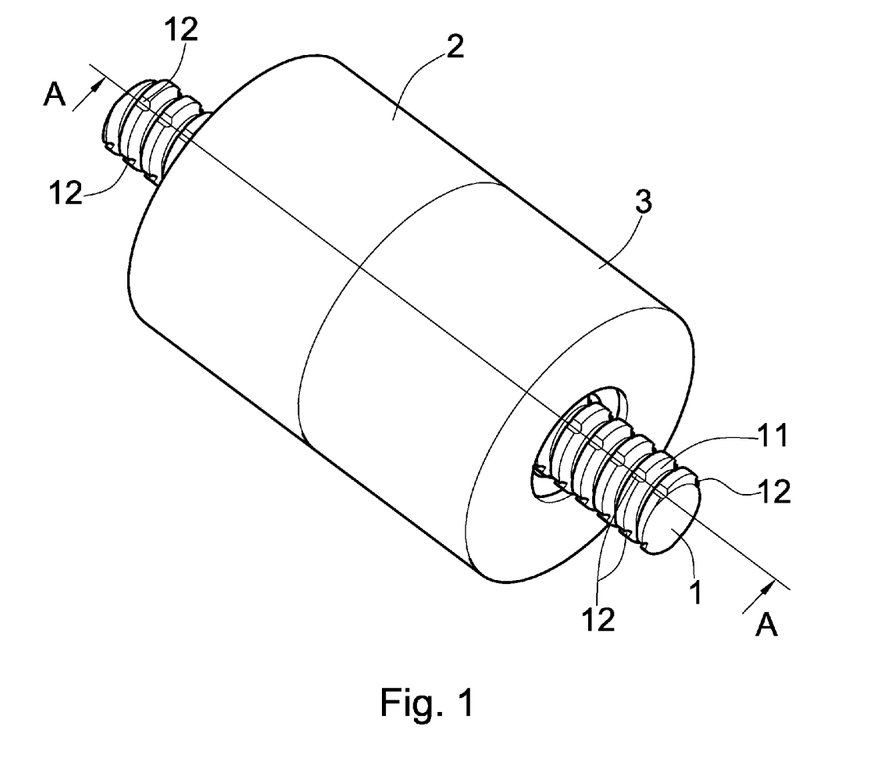
FIG. 1 is a perspective view of a first embodiment according to the present invention.

To solve the aforesaid problem, there is U.S. Pat. No. 5,782,135 which has disclosed a lubrication apparatus. In FIG. 1 of this cited reference, a spacer ball 32 is interposed between two rolling balls 31 to serve as a solid lubrication materials (MOS$_2$, Au, Ag, Pb, PTFE etc.). During operation of the ball screw unit, the dregs produced by the interposing spacer ball 32 being rubbed by two adjacent rolling balls 31 serve as the lubricant for the ball screw unit.

However, lubricating the ball screw unit as such has the following demerits:

1. The spacer ball gradually reduces its size and finally wears down completely, and the remainder of the spacer ball might become an obstacle to clog the normal operation of the ball screw unit.

2. The supply of lubricant only depending on the spacer ball is insignificant which might result in insufficient lubrication to shorten the mechanical lifetime of the ball screw unit.

Although the lubricating grease is applicable to the industries requiring dust free environments, it requires the external power to bring the viscous lubricating grease into the ball screw unit so that the extra high cost and space occupying equipment is a must.

For these defects noticeable on the prior art, an improvement is seriously required.

SUMMARY OF THE INVENTION

Accordingly, it is an object of the present invention to provide a ball screw unit with lubrication apparatus which does not need any externally means to bring the lubricating grease into the ball screw unit.

It is another object of the present invention to provide a ball screw unit with lubrication apparatus easily observable the state of decrease of the lubricant so as to accurately control the timing of supply.

To achieve the aforesaid objects, the present invention comprises a screw bolt, a nut, a plurality of rolling balls, a turning wicket, and a lubricating apparatus.

The screw bolt has a helical rolling groove surrounding along its exterior surface, and a guide groove in parallel to its center line.

The nut has a central drilled hole; a rolling ditch is formed along its interior surface corresponding to the rolling groove of the bolt. The rolling groove of the bolt and the rolling ditch of the nut are coupled to form a load passage for the rolling balls. There is a first dead end with a first sealing element at one end of the nut.

The rolling balls are rolling along the load passage.

The turning wicket is formed on the nut for the balls to turn around and circulate.

The lubrication apparatus includes an enclosure with a second dead end, a guide member, a containment hole, and a first through hole. The first and second dead ends are engaged with each other by screw coupling pin or rivet jointing, or bonded together with binders so as to secure the enclosure to the end of the nut. The containment hole is to accommodate the guide member. There is a second sealing element provided on the end surface of the containment hole in a direction facing to the guide member. The first and second sealing elements are used to seal the two end surfaces of the guide member so as to prevent the lubricating grease from brimming out the lubrication apparatus. The first through hole is in communication with the containment hole and allows the bolt to pass through. The guide member has a second through hole and a helical cavity, and the second through hole allows the bolt to pass through. In the interior surface of the second through hole, there is formed a detent part engaged with the guide groove. A helical slot is formed in the helical cavity and a grease outlet is provided at each end of the helical slot (or only provided at one end). The helical slot and the containment hole of the enclosure form a closed helical guide track. The containment hole together with the end surfaces of the nut forms a space to trammel the axial movement of the guide member so that the guide member is only allowed to move in the axial direction simultaneously with the nut.

The lubrication apparatus of the present invention is suitable for the ball screw unit in which the nut is driven by the bolt. In operation of the ball screw unit, the enclosure, which being engaged to the nut, does not rotate but moves in the axial direction along with the nut. The guide member, which being engaged to the guide groove of the bolt with the detent part, rotates simultaneously with the bolt and moves in the axial direction with the nut.

When the guide member is rotating along with the bolt, the grease stored in the guide track will flow ahead to the front terminal of the guide track and ooze out of the grease outlet to lubricate the bolt with a pressure produced by the inertia of the flowing fluid, whereas the quantity of the oozed grease is determined by the size of the grease outlet.

BRIEF DESCRIPTION OF THE DRAWINGS

The present invention may best be understood through the following description with reference to the accompanying drawings, in which.

DETAILED DESCRIPTION OF THE PREFERRED EMBODIMENT

To understand a first embodiment of the present invention, reference should be made to FIGS. 1,2,3A and 3B. The present invention comprises a screw bolt 1, a nut 2, a plurality of rolling balls X, a turning wicket, and a lubrication apparatus.

Figure 2:
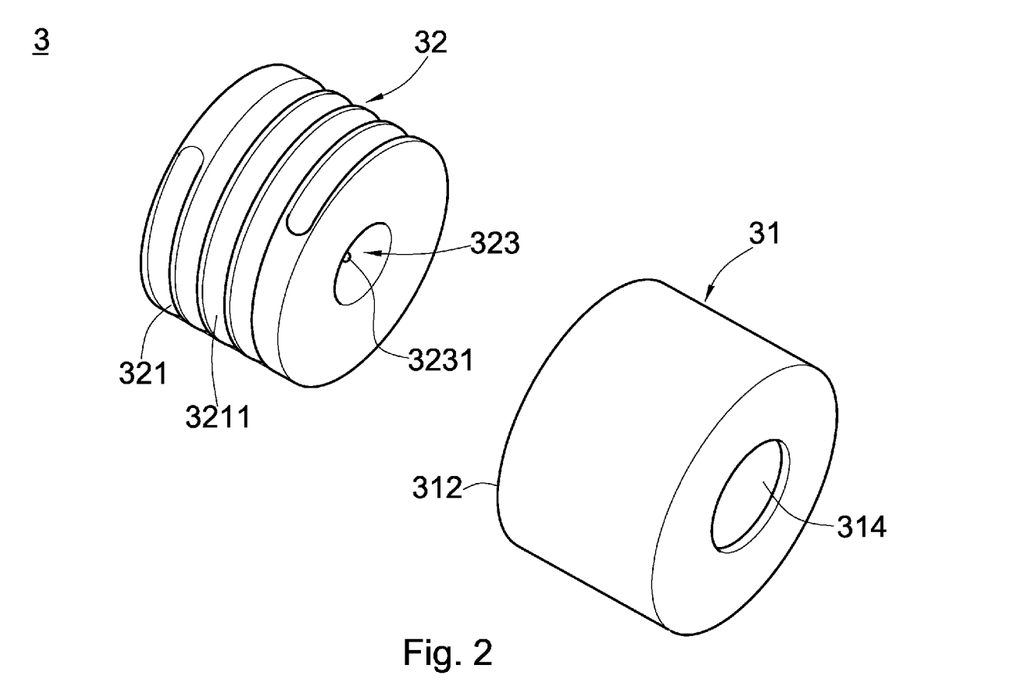
FIG. 2 is an exploded view of the lubrication apparatus in a first embodiment of the present invention.

The screw bolt 1 has a helical rolling groove 11 surrounding along its exterior surface, and at least a guide groove 12 is provided in parallel to its center line.

The nut 2 has a central drilled hole 21; a rolling ditch 211 corresponding to the rolling groove 11 of the bolt 1 is formed along the interior surface of the drilled hole 21. The rolling groove 11 and the rolling itch 211 are coupled to form a load passage for the rolling balls X. There is a first dead end 22 with a first sealing element 23 formed at the same end surface of the nut 2.

The rolling balls X are rolling along the load passage.

The turning wicket (not shown) is formed on the nut 2 for the balls X to turn around and circulate.

Figure 3A:
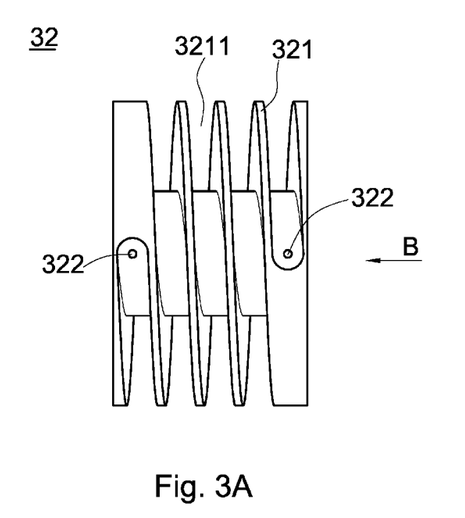
FIG. 3A is a side view of the guide member in a first embodiment of the present invention.
Figure 3B:
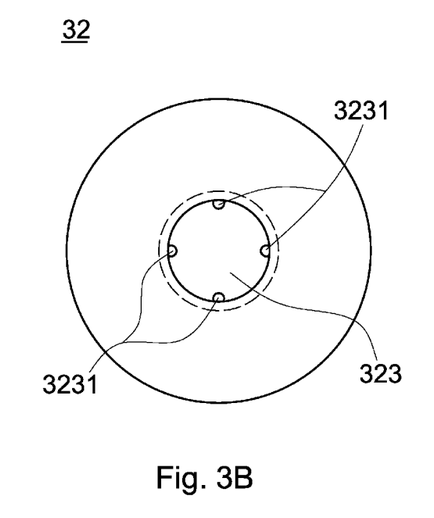
FIG. 3B is a view of FIG. 3A from direction B.

The lubrication apparatus 3 includes an enclosure 31 with a second dead end 312, a guide member 32, a containment hole 311, and a first through hole 314. The first and second dead ends 22, 312 are engaged with each other so as to secure the enclosure 31 to the end of the nut 2. The containment hole 311 is to accommodate the guide member 32 and is sealed by the first sealing element 23, at one end surface whereas a second sealing element 313 is sealing the other end surface of the containment hole 311. The two sealing elements 23, 313 are sealing the guide member 32 from two end surfaces to prevent the lubricant grease from brimming out of the lubrication apparatus 3. The first through hole 314 is in communication with the containment hole 311 and allows the bolt 1 to pass through. The guide member 32 has a second through hole 323 and a helical cavity 321, and the second through hole 323 allows the bolt 1 the pass through. In the interior surface of the second through hole 323, there is formed a detent part 3231 engaged with the guide groove 12. A helical slot 3211 is formed in the helical cavity 321 and a greases outlet 322 is provided at each end of the helical slot 3211 (or provided only at one end). The helical slot 3211 and the containment hole 311 of the enclosure 31 form a closed helical guide track 60. The containment hole 311 together with the end surfaces of the nut 2 forms a space to trammel the axial movement of the guide member 32 so that the guide member 32 is only allowable to move in the axial direction simultaneously with the nut 2.

Referring to FIGS. 5,6,7A,7B and 8, in a second embodiment, the present invention comprises a bolt 1, a nut 2, a plurality of rolling balls X, a turning wicket, and a lubrication apparatus.

Figure 5:
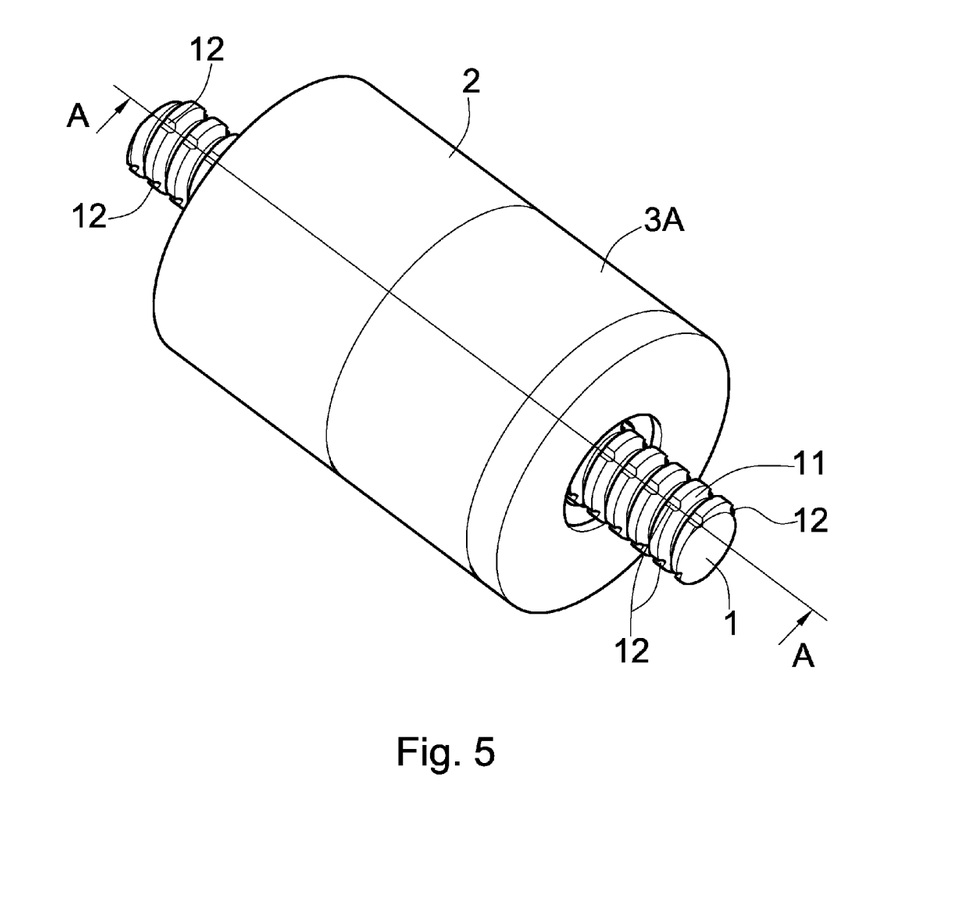
FIG. 5 is a percept view of a second embodiment according to the present invention.
Figure 6:
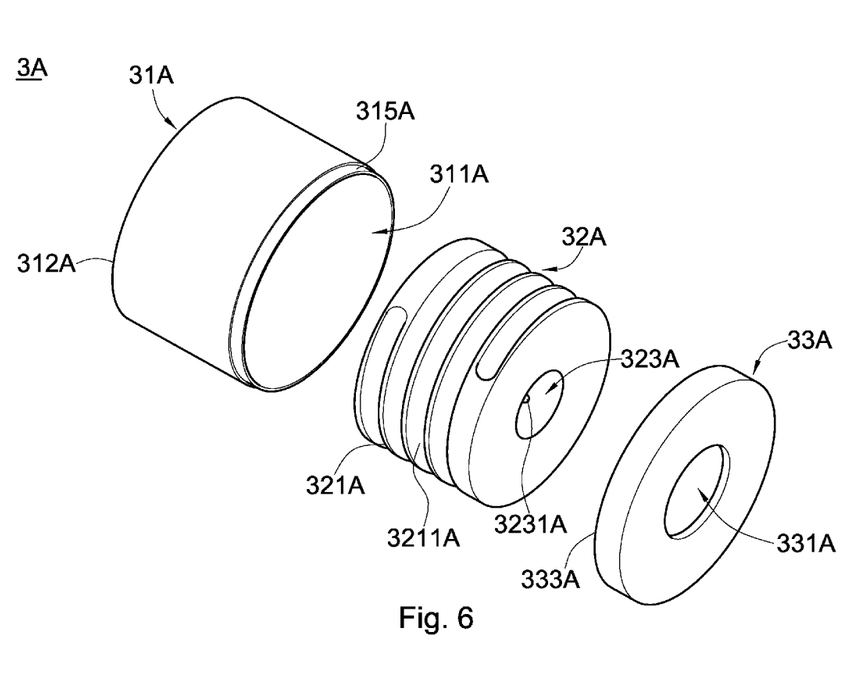
FIG. 6 is an exploded view of the lubrication apparatus in a second embodiment of the present invention.
Figure 7A:
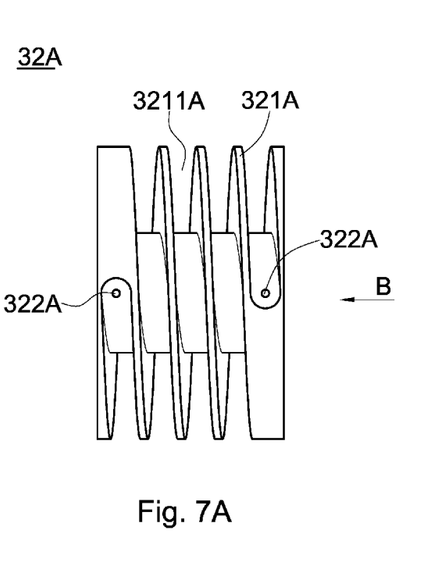
FIG. 7A is a side view of the guide member in a second embodiment of the present invention.
Figure 7B:
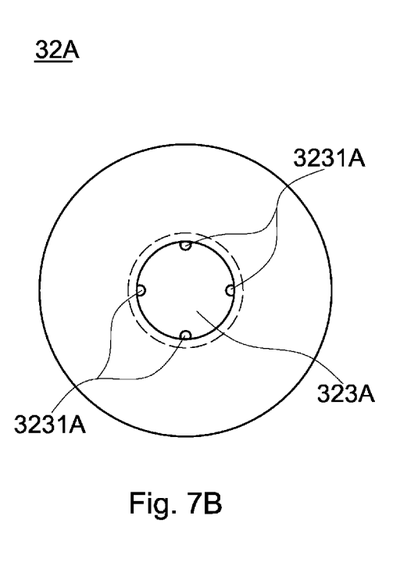
FIG. 7B is a view of FIG. 7A from direction B.

The bolt 1 has a helical rolling groove 11 surrounding along its exterior surface, and at least a guide groove 12 is provided in parallel to its center line.

The nut 2 has a central drilled hole 21; a rolling ditch 211 is formed along its interior surface corresponding to the rolling groove 11 of the bolt 1. The rolling groove 11 and the rolling ditch 211 are coupled to form a load passage for the rolling ball X. There is a first dead end 22 formed at one end thereof.

The rolling balls X are rolling along the load passage.

The turning wicket (not shown) is formed on the nut 2 for the ball X to turn around and circulate.

Figure 8:
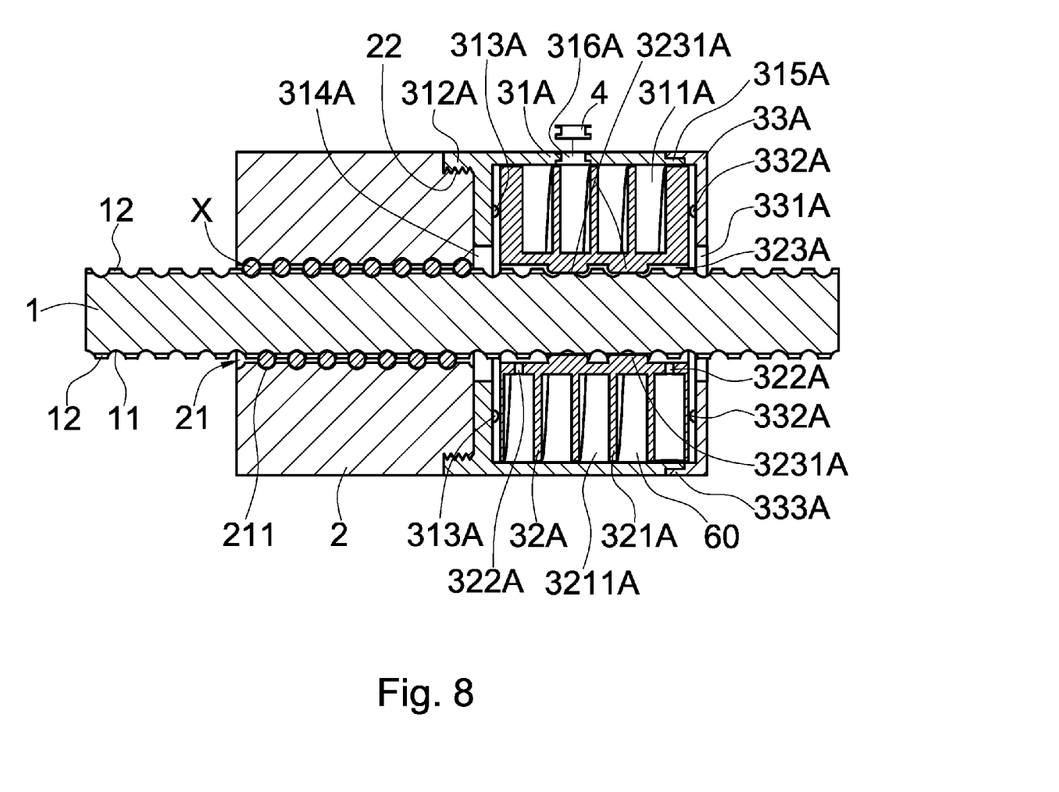
FIG. 8 is a cross sectional view of FIG. 5 cut along line A-A.

As shown in FIG. 6 and FIG. 8, the lubrication apparatus 3A comprises an enclosure 31A with a second dead end 312A, a guide member 32A, a lid 33A, a third dead end 315A, a containment hole 311A, and a first through hole 314A. The first and second dead ends 22 and 312A are engaged with each other so as to secure the enclosure 31A to the end of the nut 2. The containment hole 311A is to accommodate the guide member 324. There is a first sealing element 313A sealing the containment hole 311A at the end surface facing to the guide member 32A. The first through hole 314A is in communication with the containment hole 311A and allows the bolt 1 to pass through. The guide member 32A has a second through hole 323A and a helical cavity 321A, and the second through hole 323A allows the bolt 1 to pass through. In the interior surface of the second through hole 323A, there is formed a detent part 3231A engaged with the guide groove 12A. A helical slot 3211A is formed in the helical cavity 321A and a grease outlet 322A is provided at each end of the helical slot 3211A (or provided only at one end). The helical slot 3211A and the containment hole 311A of the enclosure 31A form a closed helical guide track 60. The lid 33A has a third dead end 315A which is engaged with a fourth dead end 333A so as to secure the lid 33A at the end portion of the enclosure 31A. There is a third through hole 331A for passing through the bolt 1. The lid 33A together with the containment hole 311A forms a space to control the guide member 32A to move in the axial direction simultaneously with the nut 2. There is a second sealing element 332A provided at the end surface of the nut 2 facing to the guide member 32A so as to seal the guide member 32A from two end surfaces together with the first sealing element 313A thereby preventing the lubricating grease from brimming out of the lubrication apparatus 3.

As for how the lubricating grease is led to the ball screw unit will be explained as follows.

Figure 4:
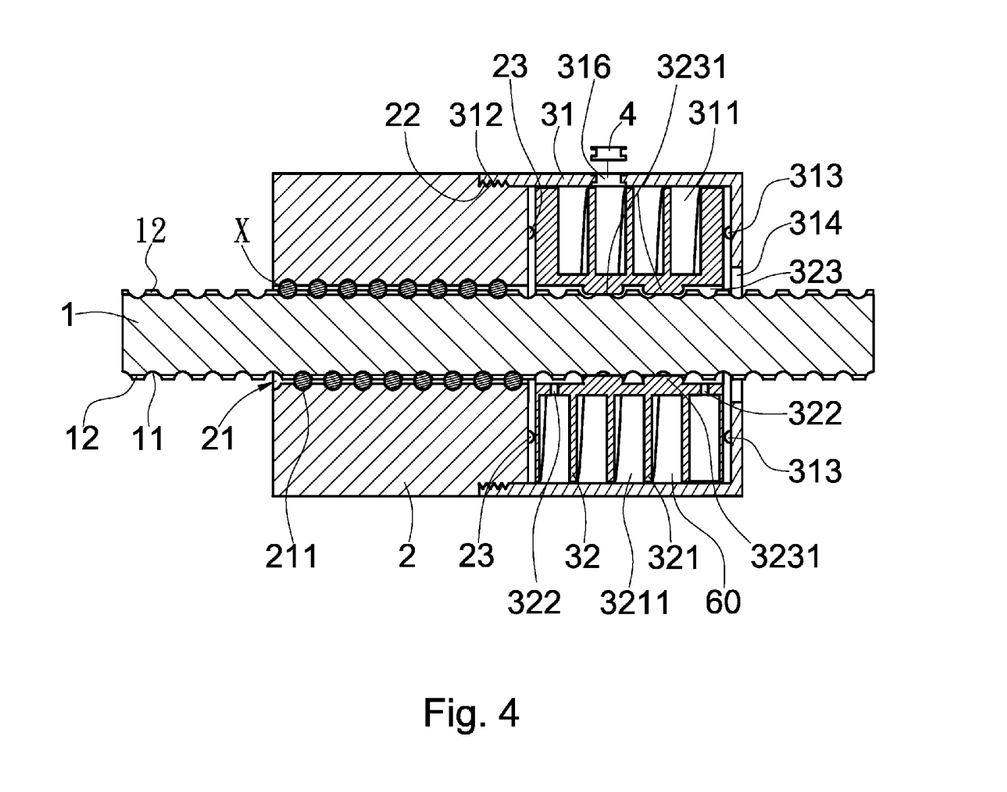
FIG. 4 is a cross sectional view of FIG. 1 cut along line A-A.

As shown in FIG. 4 and FIG. 8, at first the grease is filled in the guide track 60 from the oil inlet 316(316A), and then seals the oil inlet 316(316A) with a cork 4. As the lubrication apparatus 3(3A) of the present invention is to be applied to the ball screw unit where the bolt 1 drives the nut 2 and the enclosure 31(31A) is secured to the nut 2, therefore it is unable to rotate, and instead, linearly move in the axial direction with the nut 2. The guide member 32(32A) is tightened to the guide groove 12 of the bolt 1 by the detent part 3231 (3231A) so that the guide member 32(32A) rotates with the bolt 1 relative to the enclosure 31(31A), and moves in the axial direction with the nut 2.

When the ball screw unit is in operation, the guide member 32(32A) rotates with the bolt 1, the grease stored in the guide track 60 will flow ahead to the front terminal of the guide track 60 and ooze out of the grease outlet 322(322A) to lubricate the bolt 1 with the aid of a pressure produced due to the inertia of the flowing fluid, whereas the quantity of the oozed grease is determined by the size of the grease outlet 322(322A).

In short, it emerges from the above description that the present invention has several noteworthy advantages, in particular:

1. The lubrication of the ball screw unit can be performed automatically by own flowing pressure of the lubricating grease without the need of the extra power source.

2. The lubrication apparatus is simply constructed so it is suitable for mass production with a mold, and can be easily observed and handled.

Although the present invention has been disclosed and illustrated with respect to the preferred embodiments thereof, it is to be understood that the invention is not the be so limited and that other changes and modifications can be made within the full intended scope of the invention as hereinafter claimed.

What is claimed is:

1. A ball screw unit with lubrication apparatus, comprising:
   a screw bolt having a helical rolling groove surrounding along an exterior surface thereof, and a guide groove;
   a nut having a central drilled hole, and a rolling thread corresponding to said rolling groove of said bolt formed along an interior surface thereof; wherein said rolling groove and said rolling thread are coupled to form a load passage;
   a plurality of rolling balls rolling along said load passage; and
   a lubrication apparatus including an enclosure secured to an end portion of said nut movable in an axial direction with said nut, and a guide member; wherein said enclosure has a containment hole to accommodate said guide member, said guide member has a through hole and a helical track wall, said through hole allows said bolt to pass through and has a detent part formed on the interior surface thereof that is engaged with said guide groove, a helical slot is formed in said helical track wall, a grease outlet is provided at the end of said helical slot, and said helical slot and said containment hole of said enclosure forms a helical guide track.

2. The ball screw unit of claim 1, wherein said nut has a first fixing end at one end surface thereof.

3. The ball screw unit of claim 2, wherein a first sealing element is provided on the end surface of said nut at the same side of said first fixing end, and said first sealing element is facing to said guide member.

4. The ball screw unit of claim 3, wherein said containment hole is provided with a second sealing element at an end surface thereof facing to said guide member.

5. The ball screw unit of claim 4, wherein said first and said second sealing elements are sealing tightly to two end surfaces of said guide member.

6. The ball screw unit of claim 4, wherein said enclosure further has a second fixing end which is in engagement with said first fixing end.

7. The ball screw unit of claim 1, wherein said containment hole and end surfaces of said nut form a trammeled space for the axial movement of said guide member.

8. A ball screw unit with lubrication apparatus, comprising:
   a screw bolt having a helical rolling groove surrounding along an exterior surface thereof, and a guide groove;
   a nut having a central drilled hole, and rolling thread corresponding to said rolling groove of said bolt formed along an interior surface thereof; wherein said rolling groove and said rolling thread are coupled to form a load passage;
   a plurality of rolling balls rolling along said load passage; and
   a lubrication apparatus including an enclosure, a guide member and a lid, wherein said enclosure is secured to the end of said nut, and movable in the axial direction with said nut, said enclosure further has a containment hole to accommodate said guide member which has a through hole and a helical track wall, said through hole allows said bolt to pass through and provided with a detent part in an interior surface thereof in engagement with said guide groove, a helical slot with a grease outlet at an end thereof is formed in said helical track wall, said helical slot and said containment hole forms a helical guide track, said lid covers on the end of said enclosure and is formed with another through hole to allow said bolt to pass through.

9. The ball screw unit of claim 8, wherein said nut has a first fixing end at one end surface thereof.

10. The ball screw unit of claim 9, wherein said enclosure further has a second and a third fixing ends, and said second one is engaged with said first one.

11. The ball screw unit of claim 10, wherein said lid further has a fourth fixing end engaged with said third one.

12. The ball screw unit of claim 8, wherein said containment hole is provided with a first sealing element at an end surface thereof facing to said guide member.

13. The ball screw unit of claim 12, wherein a second sealing element is provided for said lid at an end surface thereof facing to said guide member, and said first and said second sealing elements are affixed hermetically to the both end surfaces of said guide member.

14. The ball screw unit of claim 8, wherein said lid and said containment hole form a trammeled space for the axial movement of said guide member.

* * * * *